United States Patent [19]

Walters

[11] 4,429,959
[45] Feb. 7, 1984

[54] SPECTACLE MOUNTED HINGED MONOCULAR OR BINOCULAR VISION AID

[76] Inventor: Samuel Walters, 3134 Dona Emilia Dr., Studio City, Calif. 91604

[21] Appl. No.: 319,271

[22] Filed: Nov. 9, 1981

[51] Int. Cl.$^3$ ............................ G02C 7/08; G02C 1/00
[52] U.S. Cl. ........................................ 351/158; 351/57
[58] Field of Search ................... 351/41, 158, 57, 58, 351/59; 350/547, 548, 549

[56] References Cited

U.S. PATENT DOCUMENTS 2,024,322  12/1935  Wittig .................................. 351/158

Primary Examiner—John K. Corbin
Assistant Examiner—Rodney B. Bovernick
Attorney, Agent, or Firm—Lyon & Lyon

[57] ABSTRACT

There is disclosed herein a vision aid for doctors, dentists, visually-handicapped, engineers, mechanics, technicians, and the like. The device comprises a conventional eyeglass frame having mounted thereto a pair of plastic elevating plates and which are hinged with respect to the eyeglass frame. One monocular, or a pair of monoculars forming a binocular, can be secured to the elevating plates. The elevating plates are connected together and attached to the hinges in a manner to allow the interocular or pupil distance to be readily set or readjusted, and also allow the monoculars to be adjusted up and down vertically with respect to the axis of the wearer's eyes. The hinged arrangement allows the elevating plates to tilt up to thereby move the monocular or monoculars out of the line of vision, so as to restore the wearer's natural vision or vision as corrected by corrective lenses in the eyeglass frames. The monoculars also are mounted in a manner to allow alignment and re-alignment of the axis of the monoculars to toe in or toe out these lenses so that it can be parrallax adjusted for any close working distance to allow for exact collimation. The overall assembly is relatively simple, compact and lightweight. The monoculars can be fixed focus but generally are lenses of variable focus.

9 Claims, 4 Drawing Figures

SPECTACLE MOUNTED HINGED MONOCULAR OR BINOCULAR VISION AID

BACKGROUND OF THE INVENTION

The present invention relates to optical devices, and more particularly to eyeglass or spectacle mounted lenses comprising a monocular or binocular serving as a vision aid.

A number of devices are available as vision aids, and among them are various forms and powers of monoculars which can be hand-held or mounted in eyeglass or spectacle frames. Several forms of vision aids include means for attaching one or two monoculars to spectacles. One of these is designated the "Maxer" and comprises a black metal plate which is attached by spring-detent hinges to the top of eyeglass frame. The metal plate includes horizontally elongated holes into which the monoculars are mounted and these holes allow the lens spacing or pupil distance to be adjusted. Another form of device of this nature is referred to as a Neitz New Loupe which comprises a bracket and a pair of rings which hold a pair of monoculars in front of spectacles. The device includes adjusting screws for setting the pupil distance. Another device of this nature is the Inami micro-binocular loupe which also has a bracket with adjustable rings for holding loupes or monoculars similar to the Neitz device, but the Inami device is hinged with respect to the spectacles to allow the loupes to flipped up out of the way.

The prior monocular and binocular devices of the above nature have been used for numerous people for various purposes. For example, doctors and dentists use them for surgical procedures, and a surgeon typically uses binoculars having a focal length of approximately twelve to eighteen inches and a power of two and one half to four. Mechanics, engineers, model makers and hobbyists generally use them in focal lengths of twelve to twenty-four inches and in a similar power range. The visually handicapped typically use monoculars having focal lengths from seven inches on out to infinity, and use them in a power range of from three to ten. Such devices, for example, can enable an auto mechanic who is visually handicapped to lead a productive life and legally blind person to use a typewriter. There is some use of these devices for viewing sports, and in this case the focal length usually is infinity and the power range typically is higher, such as from 2½ to 3. Some users of such visual aids normally wear prescription lenses, and in this case it is desirable that the monocular or binocular device be attached to the spectacles in a manner such that they can be flipped out of the way for normal viewing.

While the devices described above are useful, each has one or more disadvantages. None of the foregoing devices, for example, provides for raising and lowering the monoculars so as to properly and adjustably align the lens axis vertically with the pupils of the wearer or to allow the wearer to select higher or lower positions for the monoculars for different viewing purposes. Furthermore, most of the prior devices are relatively bulky and heavy and include complex arrangements for adjusting the pupil distance, and some cannot be flipped out of the way for normal viewing.

SUMMARY OF THE INVENTION

On the other hand, the device of the present invention overcomes the foregoing difficulties through the provision of a pair of lightweight and relatively simple plates, preferably formed of plastic, which are attached together and hinged to the top of the eyeglass frames. One or both of the plates includes an aperture for receiving a monocular. The manner in which the two plates are secured together at a hinge lip and secured to hinges allows the pupil distance to be readily and simply adjusted, and further allows the plates to be readily and simply raised and lowered so as to have the lenses properly coincide with the wearer's pupils or to allow elevational adjustment of the lenses for other viewing purposes. The hinge arrangement allows the plates and monoculars to be tilted or flipped up out of the way for normal viewing. The two plates may be identical which facilitates manufacture, and they are relatively lightweight and compact.

Accordingly, it is an object of the present invention to provide an improved form of vision aid.

Another object of the present invention is the provision of a simple plate assembly for receiving one or two lenses, and wherein the placement of the lenses with respect to the pupils of a wearer can be readily adjusted.

DESCRIPTION OF THE DRAWING

These and other objects and features of the invention will become better understood through a consideration of the following description taken in conjunction with the drawing in which.

DETAILED DESCRIPTION OF THE PREFERRED EMBODIMENT

Figure 1:
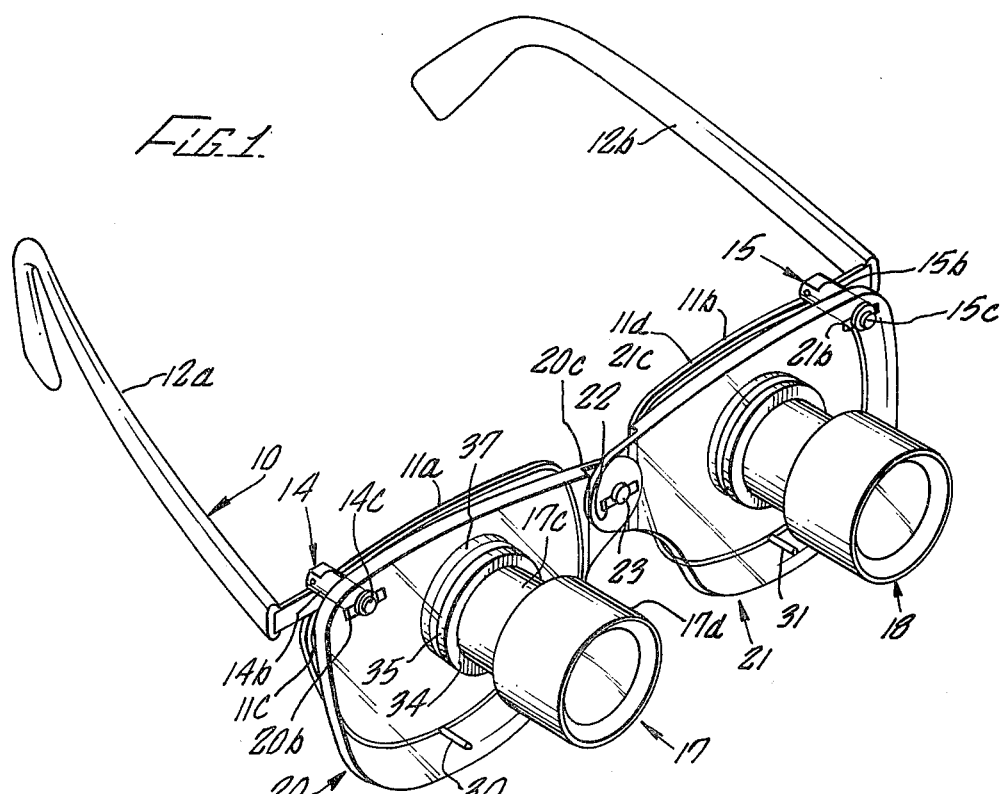
FIG. 1 is a perspective view of the device of the present invention.

Turning now to the drawing, FIG. 1 shows standard spectacles 10 of conventional construction comprising frame section 11a and 11b, which hold respective lenses 11c and 11d, and bow or ear pieces 12a and 12b. The spectacles 10 may be of different sizes to fit different people. A pair of spring-detent hinges 14 and 15 of conventional form each have one end (note 14a in FIG. 3) affixed to the upper part of the frame sections 11a and 11b, respectively. As thus described, the device of FIG. 1 is conventional and has been used with a one-piece metal plate attached to the hinges 14-15 and which plate received a pair of monoculars like 17-18 to form binoculars.

The improved vision aid device of the present invention comprises a pair of plates 20 and 21 which preferably are formed of clear plastic. As can be seen from FIGS. 1 and 2, the plates 20 and 21 are identical. These plates include respective central holes 20a and 21a for receiving the respective monoculars 17 and 18. The plates can be tinted if desired, and if only one monocular is used preferably the other plate is black or frosted to reduce distraction. The plates also include horizontal elongated slots 20b and 21b for allowing attachment of the plates to the respective posts 14b-15b of the hinges 14-15 with screw fasteners 14c-15c so that the plates 20 and 21 flip up as a unit (note the dashed line position in FIG. 3). The plates 20 and 21 each have another elongated slot 22 formed in respective center lips 20c and 21c. The slots 20b, 21b and 22 allow the plates to be moved together or apart (for example, about 55 to 70 mm) to enable the pupil distance to be adjusted. They also allow (particularly slots 22) the plates to be raised and lowered as described below.

Figure 2:
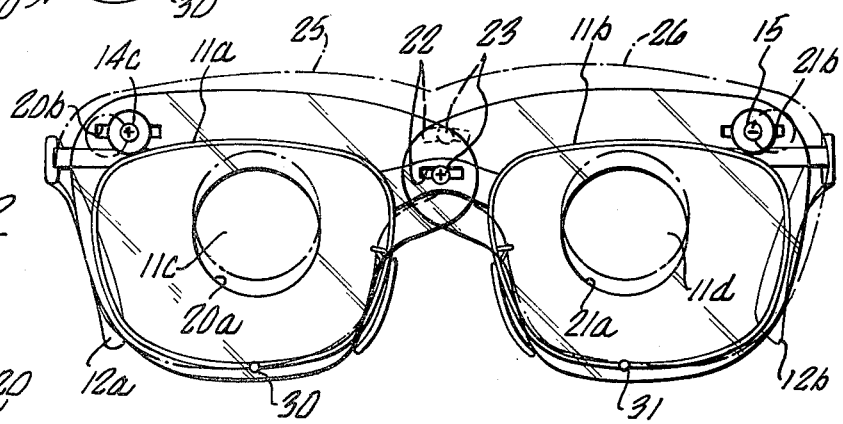
FIG. 2 is a front elevational view thereof.
Figure 3:
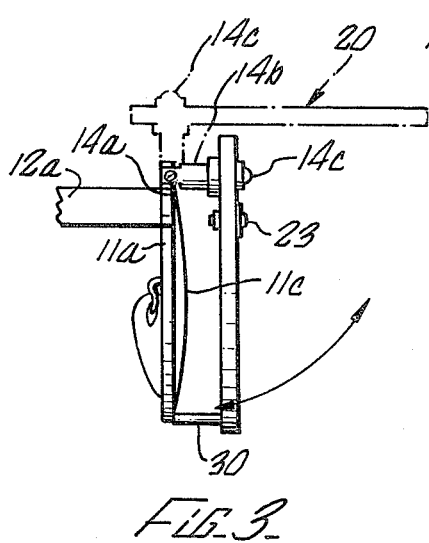
FIG. 3 is a side elevational view thereof.

The lips 20c-21c are approximately one-half the thickness of the remainder of the plates 20-21, and these lips along with the slots 22 and a screw fastener 23 allow the lip ends of the plates 20-21 to be secured together and also allow the plates (and thus the monoculars 17-18) to be adjustably raised and lowered throughout a range as indicated in full lines in FIG. 2 and in dotted lines 25-26 in FIG. 2. This raising and lowering or change in the elevation of the plates 20-21 allows the monoculars 17 and 18 to be properly aligned vertically with the pupils of the wearer's eyes. This arrangement also allows the monoculars to be raised and lowered for different viewing purposes. For example, the monoculars should be aligned with the pupils for normal viewing, lowered below the normal horizontal axis of the pupils (like the bifocal lenses in bifocal glasses) for close work such as technical and medical use, and should be raised above the round axis of the pupils for reading signs, as when driving. As a particular example, a visually handicapped mechanic generally would want to lower the monoculars 17-18 below the normal horizontal axis of the pupils (when the eyes are aimed straight ahead) so as to allow him to view his work more comfortably as he tilts his eyes downwardly toward his work. The ability to raise and lower the monoculars is a significant advantage of the vision aid device of the present invention. A pair of posts 30 and 31 are affixed at the bottom of the respective plates 20 and 21 (or affixed at the bottom of the frame sections 11a-11b) to properly space the plates 20-21 from the frame sections 11a-11b and/or eyelgass lenses 11c and 11d in the spectacles, particularly as indicated in FIG. 3.

Figure 4:
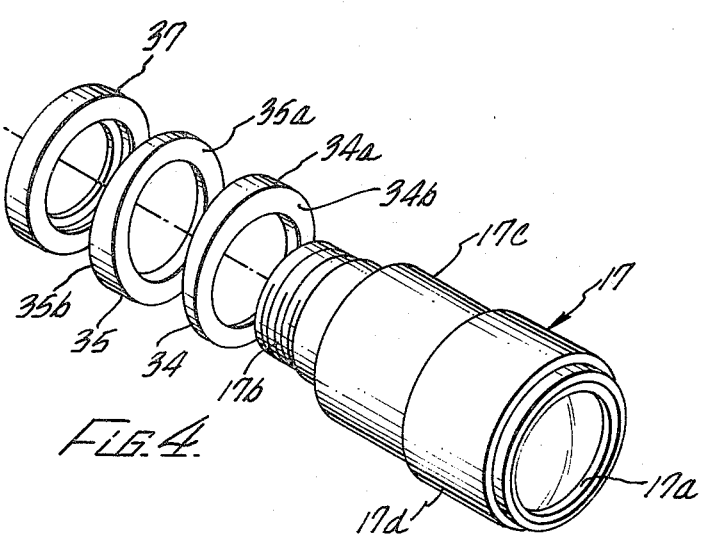
FIG. 4 is a view of a monocular and mounting means therefor.

In addition to enabling adjustment of the monoculars 17-18 in and out horizontally and up and down vertically, they may be toed in and out through the use of conventional wobble washers 34 and 35. The monocular 17 shown in FIG. 4 includes an objective end 17a, a threaded ocular end 17b, a tube or body 17c and a focus ring 17d. The threaded end 17b is inserted through the hole 20a in plate 20 with the wobble washers 34-35 thereon (with the back flat surface 35b of the rear washer 35 abutting the front surface of the plate 20). Then, a threaded nut 37 is screwed onto the threaded end 17b to thereby secure the monocular 17 to the plate 20. It will be noted that the washers 34 and 35 have abutting inclined faces 34a and 35a and flat outer faces 34b and 35b. As will be apparent, rotation of one washer 34 with respect to the other washer 35 will cause the axis of the monocular 17 to deviate from a line perpendicular to the surface of the plate 20. Thus, by adjusting the washers 34-35 with respect to each other, and then securing the threaded nut 37, toe-in or toe-out of the monocular 17 can be accomplished. The same holds true for adjustment of the monocular 18 which likewise has associated therewith a pair of wobble washers.

While a preferred embodiment of the present invention has been described and illustrated, modifications will be apparent to those skilled in the art and it is intended to include all such modifications and variations within the scope of the appended claims.

What is claimed is:

1. A visual aid device adapted to be hingeably attached to spectacle frames and for mounting one or more monoculars through which the eye or eyes of the wearer can view objects comprising first and second plates, said plates being generally in the shape of a conventional spectacle lens but including a lip on one side and wherein the lips of the plates can be overlapped to provide a central pivot point and hinge, and each of said plates having a first elongated hole at a side substantially opposite the lip of the respective plate, and the lips of each plate having a second elongated hole forming said pivot point, at least one of said plates having a substantially central aperture for receiving a monocular, and said first elongated holes being adapted to be secured to a hinge member attached to respective frame sections of spectacles and to allow, along with holes in the lips, pupil distance to be adjusted and set, and said second holes in said lips adapted to receive a fastener to lock said plates in a predetermined relationship for allowing the plates to be moved up and down with respect to the pupils of a wearer's eye.

2. A device as in claim 1 including
spacer means affixed near a lower edge of each of said plates for spacing said plates away from associated spectacle frames.

3. A device as in claim 1 wherein
both of said plates are substantially identical and have a generally central aperture, and both include a monocular mounted in each said aperture.

4. A device as in claim 3 wherein
mounting means for said monoculars includes a pair of washers having inclined facing surfaces and when adjusted relative to each other allow the monoculars to be toed in and out.

5. A device as in claim 1 wherein
said first and second plates are formed of clear plastic and are substantially identical.

6. A visual aid device adapted to be hingeably attached to spectacle frames and for mounting a pair of monoculars through which the eyes of the wearer can view objects comprising first and second plates, said plates being substantially identical and formed of plastic, said plates being generally in the shape of a conventional spectacle lens but including a lip on one side whereby the lips of the plates can be overlapped to provide a central hinge point, each of said plates having a central aperture and a monocular secured thereto, and each of said plates having a first elongated hole at a side substantially opposite the lip of the respective plate, and the lips of each plate having a second elongated hole forming said hinge point, and said first elongated holes being adapted to be secured with respective hinge members of frame sections of spectacles and to allow, along with holes in the lips, the pupil distance of the plates to be adjusted and set, and said second holes in said lips adapted to receive a fastener to secure said plates in a predetermined relationship and for allowing the plates to be moved up and down with respect to the pupils of the eyes of a wearer and to be locked in a selected position with respect to such pupils.

7. A device as in claim 6 wherein
said plates are formed of a substantially clear plastic.

8. A visual aid device comprising
spectacle frames with hinge devices thereon,
first and second plates, said plates being substantially identical and formed of plastic, said plates being generally flat and having an outer shape generally like a conventional spectacle lens but including a lip on one side whereby the lips of the plates can be overlapped to provide a central hinge point, and at least one of said plates having a central aperture adapted to have a monocular secured thereto, and each of said plates having a first elongated hole at a side substantially opposite the lip of the respective plate, and the lips of each plate having a second elongated hole forming said hinge point, and said first elongated holes being secured with respective hinge devices of the spectacle frames to allow, along with holes in the lips, the pupil distance of the plates to be adjusted and set, and said second holes in said lips having a fastener to secure said plates in a predetermined relationship and for allowing the plates to be moved up and down with respect to the pupils of the eyes of a wearer and to be locked in a selected position with respect to such pupils.

9. A device as in claim 8 wherein said plates are formed of a substantially clear plastic and each has a central aperture with a monocular secured thereto thereby forming a binocular, and means spacing lower edges of said plates with respect to said spectacles.

* * * * *